United States Patent [19]

Takase et al.

[11] Patent Number: 4,715,693

[45] Date of Patent: Dec. 29, 1987

[54] VARI-FOCAL PHOTOGRAPHIC LENS SYSTEM OF REAR LENS GROUP EXCHANGE TYPE

[75] Inventors: Hiroshi Takase; Masaki Imaizumi; Toru Fujii, all of Tokyo, Japan

[73] Assignee: Olympus Optical Co., Ltd., Tokyo, Japan

[21] Appl. No.: 701,040

[22] Filed: Feb. 12, 1985

[30] Foreign Application Priority Data

Feb. 16, 1984 [JP] Japan ................................ 59-26073

[51] Int. Cl.$^4$ ..................... G02B 15/02; G02B 9/34; G02B 9/60
[52] U.S. Cl. .................................. 350/422; 350/465; 350/469
[58] Field of Search ................... 350/422, 465, 469

[56] References Cited

U.S. PATENT DOCUMENTS

| | | | |
|---|---|---|---|
| 4,253,736 | 3/1981 | Momiyama | 350/422 |
| 4,340,279 | 7/1982 | Ikamori | 350/422 |
| 4,394,071 | 7/1983 | Yamada | 350/422 |
| 4,422,734 | 12/1983 | Tanaka et al. | 350/422 |
| 4,466,707 | 8/1984 | Ikemori et al. | 350/422 |
| 4,591,234 | 5/1986 | Hamanishi | 350/422 |
| 4,596,447 | 6/1986 | Yamada et al. | 350/422 |

FOREIGN PATENT DOCUMENTS

| | | | |
|---|---|---|---|
| 56-132305 | 10/1981 | Japan | 350/422 |
| 57-46224 | 3/1982 | Japan | 350/422 |
| 58-215619 | 12/1983 | Japan | 350/422 |

Primary Examiner—John K. Corbin
Assistant Examiner—Scott J. Sugarman
Attorney, Agent, or Firm—Cushman, Darby & Cushman

[57] ABSTRACT

A vari-focal photographic lens system of rear lens group exchange type comprising a front lens group and a rear lens group and arranged to vary the focal length of the lens system as a whole by exchanging the rear lens group for another rear lens group having a different lens configuration, the vari-focal photographic lens system being arranged so compactly and arranged that the variation of aberrations is small.

4 Claims, 12 Drawing Figures

VARI-FOCAL PHOTOGRAPHIC LENS SYSTEM OF REAR LENS GROUP EXCHANGE TYPE

BACKGROUND OF THE INVENTION

1. Field of the Invention

The present invention relates to a vari-focal photographic lens system and, more particularly, to a vari-focal photographic lens system of rear lens exchange type of which the focal length is variable and which is to be used with a camera with a lens shutter (hereinafter referred to as a popular camera).

2. Description of the Prior Art

As one of known methods for varying the focal length of a photographic lens system, there is a method to attach an auxiliary lens system in rear of a master lens system. This type of lens system is disclosed, for example, in Japanese published unexamined patent application No. 46224/82. However, in case of said type of lens system, the master lens only is also used for photographing without attaching the auxiliary lens system and, therefore, it is essential to favourably correct aberrations of the master lens system itself. This means that the master lens system itself and auxiliary lens system itself should be respectively arranged that aberrations thereof are favourably corrected independently of each other and, consequently, correction of aberrations is difficult. To solve the above-mentioned problem, it is necessary to arrange that each of the master lens system and auxiliary lens system has a complicated lens configuration and, therefore, the lens system as a whole including the master and auxiliary lens systems are not compact. Moreover, the number of lenses constituting the lens system as a whole becomes large, and this is not desirable because that cost of production becomes high.

As another method for varying the focal length of a photographic lens system, it is known to exchange some of lens components constituting the lens system. This type of lens system is disclosed, for example, in Japanese published unexamined patent application No. 132305/81. The lens system disclosed in said patent application consists of three lens components, i.e., a positive, negative and positive lens components, and is arranged to vary the focal length by exchanging the negative lens component which is arranged as a second lens component. In case of said method, the second negative lens component is to be inserted to and taken out of a small space between the first and third lens components and, therefore, it is difficult to secure a space for providing a mechanism for attaching and detaching the second lens component. Moreover, in case of a lens system consisting of three lens components, i.e., a positive, negative and positive lens components, the eccentricity of the second negative lens component generally causes a large decrease in the quality of the image. Therefore, when said method to exchange the second negative lens component is adopted, it is difficult to ensure a favourable quality of image.

SUMMARY OF THE INVENTION

It is, therefore, a primary object of the present invention to provide a vari-focal photographic lens system of rear lens group exchange type comprising a front lens group and a rear lens group and arranged to vary the focal length by exchanging the rear lens group, said vari-focal photographic lens system being arranged compactly to suit the use with popular cameras and arranged that variation of aberrations is small.

When a lens system is composed of two lens groups, i.e., a front lens group and a rear lens group, it is possible to vary the focal length of the lens system as a whole by varying the imaging magnification of the rear lens group. As a method for varying the imaging magnification of the rear lens group, the airspace between the two lens groups may be varied as in case of zoom lens systems. In the present invention, however, the lens system is arranged to vary the focal length by exchanging the rear lens group. By arranging to exchange the rear lens group for a different rear lens group as mentioned in the above, the photographic lens system according to the present invention can be put to the states of different focal lengths, i.e., a wide position, teleposition, etc. and, at the same time, it is made possible to correct aberrations in respective states of focal lengths individually.

For a lens system composed of a front lens group and a rear lens group as mentioned in the above, there are four different combinations of focal lengths of the front lens group and rear lens group as shown in (1) through (4) below when the focal length of the lens system as a whole in the wide position is represented by reference symbol $f_W$, the focal length of the lens system as a whole in the teleposition is represented by reference symbol $f_T$, and the focal length of the front lens group is represented by reference symbol $f_M$.

(1) In case of $0 < f_M < f_W$, the imaging magnification of the rear lens group should be larger than 1 in both of the wide position and teleposition. Besides, as $f_M > 0$, rays which enter the rear lens group are converging rays. To make the imaging magnification larger than 1 in converging rays, the rear lens group should have a focal length of negative value.

(2) In case of $f_W < f_M < f_T$, the imaging magnification of the rear lens group should be larger than 0 but smaller than 1 in the wide position and should be larger than 1 in the teleposition. From the result described in (1) in the above, the rear lens group should have a focal length of negative value in the teleposition. Besides, to materialize an imaging magnification larger than 0 but smaller than 1 in converging rays, it is known that a lens group should have a focal length of positive value. Therefore, in the wide position, the rear lens group should have a focal length of positive value.

(3) In case of $f_T < f_M$, the imaging magnification of the rear lens group should be larger than 0 but smaller than 1 in both of the wide position and teleposition. In this case, from the result described in (2) in the above, the rear lens group should have a focal length of positive value both in the wide position and in the teleposition.

(4) In case of $f_M < 0$, the imaging magnification of the rear lens group should be smaller than 0 in both of the wide position and teleposition. As $f_M < 0$, rays which enter the rear lens group are diverging rays. As known well, to materialize an imaging magnification smaller than 0 in diverging rays, a lens group should have a focal length of positive value. Therefore, the rear lens group should have a focal length of positive value both in the wide position and in the teleposition.

The results of explanation in the above are shown in the table below.

TABLE

| Focal length of front lens group | Focal length of rear lens group | |
|---|---|---|
| | wide position | teleposition |
| (1) $0 < f_M < f_W$ | negative | negative |

TABLE-continued

| Focal length of front lens group | Focal length of rear lens group | |
|---|---|---|
| | wide position | teleposition |
| (2) $f_W < f_M < f_T$ | positive | negative |
| (3) $f_T < f_M$ | positive | positive |
| (4) $f_M < 0$ | positive | positive |

By the explanation so far, the mechanism for varying the focal length is clarified. To arrange that the position of image does not change even when the magnification is varied, it is necessary to correct the image position. However, in case that the distance between the object and image for the rear lens group is constant in both of the wide position and teleposition, by exchanging the rear lens group, it is possible to vary the focal length and, at the same time, to keep the image position unchanged and it is not necessary to perform any additional operation specially. The condition required for materializing the above in as follows:

$$-\frac{(1-\beta_R)^2}{\beta_R} f_R + HH_R' = \text{Constant}$$

where, reference symbol $\beta_R$ represents the magnification of the rear lens group, reference symbol $f_R$ represents the focal length of the rear lens group, and reference symbol $HH_R'$ represents the distance between principal points of the rear lens group.

When the condition shown by the above formula is not fulfilled, it is necessary to move the front lens group or a part of lenses in the front lens group in order to correct the image position.

Figure 9:
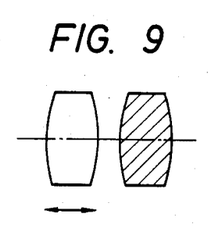
FIGS. 9 through 12 respectively show schematic views illustrating the image position correcting methods.
Figure 10:
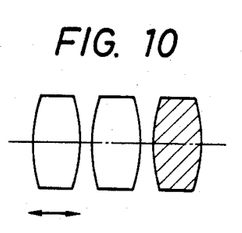
Figure 11:
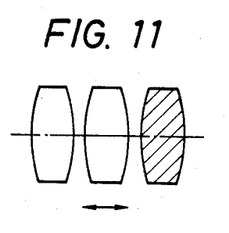
Figure 12:
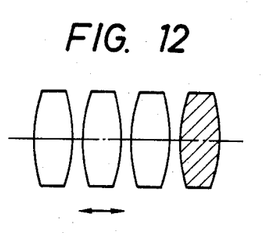

FIG. 9 shows a method to correct the image position by moving the front lens group as a whole. FIG. 10 shows a method to correct the image position by dividing the front lens group into two subgroups and by moving the subgroup arranged on the object side out of said subgroups. FIG. 11 shows a method to correct the image position by dividing the front lens group into two subgroups in the same way as above but moving the subgroup arranged on the image side out of said subgroups. FIG. 12 shows a method to correct the image position by dividing the front lens group into three subgroups and by moving the middle subgroup out of said subgroups. In each of said figures, the hatched portion shows the rear lens group.

In case that the image position is corrected by moving the front lens group as a whole or a part of lenses in the front lens group as described in the above, it is sometimes advantageous for correction of aberrations to move the stop together with the subgroup to be moved for the purpose of correcting the image position. However, when the stop is moved in case of popular cameras, the mechanism for moving the subgroup in co-operation with the stop becomes complicated, and this is disadvantageous for arranging the popular cameras compactly. Therefore, it is preferable to arrange that the stop is kept fixed in respect to the image surface. When the front lens group as a whole or a part of lenses in the front lens group is moved by keeping the stop fixed in respect to the image surface, variation of the entrance pupil becomes large, and this is disadvantageous for correction of offaxial aberrations. However, in case of the photographic lens system according to the present invention, it is possible to select the type of lens composition of the rear lens group individually for the wide position and teleposition. Therefore, when the types of lens composition which are the most suitable for correction of aberrations are selected individually for the wide position and teleposition, it is possible to eliminate the above-mentioned disadvantage. Besides, when an aspherical surface is adopted, it is possible to further improve the performance of the lens system.

For popular cameras, the focusing method to advance the front lens group is adopted generally. For the vari-focal photographic lens system according to the present invention, it is also possible to arrange that the lens system is focused by utilizing the afore-mentioned lens group or subgroup to be moved for the purpose of correcting the image position. In that case, it is possible to arrange that the lens moving mechanism for correction of the image position serves also as the lens moving mechanism for focusing and, therefore, it is possible to simplify the mechanism of the lens mount. Besides, it is also possible to arrange that the lens system is focused by moving a lens or lenses other than the lens or lenses to be moved for correction of the image position.

DETAILED DESCRIPTION OF THE PREFERRED EMBODIMENTS

Now, preferred embodiments of the vari-focal photographic lens system of rear lens group exchange type according to the present invention are shown below.

Embodiment 1

(wide position)
$f = 39.33, F/3.6$
$r_1 = 14.716$
$d_1 = 3.6$  $n_1 = 1.7725$  $\nu_1 = 49.66$
$r_2 = 30.689$
$d_2 = 1.9$
$r_3 = -54.826$
$d_3 = 1.0$  $n_2 = 1.78472$  $\nu_2 = 25.71$    I
$r_4 = 24.888$
$d_4 = 2.868$
$r_5 = 28.021$
$d_5 = 3.934$  $n_3 = 1.8061$  $\nu_3 = 40.95$
$r_6 = -48.605$
$d_6 = 4.917$
$r_7 = -246.227$
$d_7 = 4.25$  $n_4 = 1.883$  $\nu_4 = 40.76$
$r_8 = -21.327$
$d_8 = 0.806$    II
$r_9 = -12.182$
$d_9 = 0.853$  $n_5 = 1.59271$  $\nu_5 = 35.29$
$r_{10} = -1407.457$
(teleposition)
$f = 48.25, F/4$
$r_1 = 14.716$ -continued

Embodiment 1

| | | |
|---|---|---|
| $d_1 = 3.6$ | $n_1 = 1.7725$ | $\nu_1 = 49.66$ |
| $r_2 = 30.689$ | | |
| $d_2 = 1.9$ | | |
| $r_3 = -54.826$ | | |
| $d_3 = 1.0$ | $n_2 = 1.78472$ | $\nu_2 = 25.71$ |
| $r_4 = 24.888$ | | |
| $d_4 = 2.868$ | | |
| $r_5 = 28.021$ | | |
| $d_5 = 3.934$ | $n_3 = 1.8061$ | $\nu_3 = 40.95$ |
| $r_6 = -48.605$ | | |
| $d_6 = 11.077$ | | |
| $r_7 = -8.905$ | | |
| $d_7 = 1.0$ | $n_4 = 1.50137$ | $\nu_4 = 56.40$ |
| $r_8 = -35.404$ | | |

Group I: rows with $d_1$ through $r_5$; Group II': rows with $d_5$ through $r_8$.

Embodiment 2

(wide position)
$f = 39.37$, $F/4.24$

| | | |
|---|---|---|
| $r_1 = 14.712$ | | |
| $d_1 = 3.6$ | $n_1 = 1.7725$ | $\nu_1 = 49.66$ |
| $r_2 = 30.622$ | | |
| $d_2 = 1.9$ | | |
| $r_3 = -54.857$ | | |
| $d_3 = 1.0$ | $n_2 = 1.78472$ | $\nu_2 = 25.71$ |
| $r_4 = 24.898$ | | |
| $d_4 = 3.016$ | | |
| $r_5 = 29.687$ | | |
| $d_5 = 3.855$ | $n_3 = 1.863$ | $\nu_3 = 41.53$ |
| $r_6 = -53.4$ | | |
| $d_6 = 4.762$ | | |
| $r_7 = -297.795$ | | |
| $d_7 = 4.229$ | $n_4 = 1.883$ | $\nu_4 = 40.76$ |
| $r_8 = -20.258$ | | |
| $d_8 = 0.784$ | | |
| $r_9 = -12.318$ | | |
| $d_9 = 0.876$ | $n_5 = 1.62005$ | $\nu_5 = 36.25$ |
| $r_{10} = 675.413$ | | |

(teleposition)
$f = 48.25$, $F/4.66$

| | | |
|---|---|---|
| $r_1 = 14.712$ | | |
| $d_1 = 3.6$ | $n_1 = 1.7725$ | $\nu_1 = 49.66$ |
| $r_2 = 30.622$ | | |
| $d_2 = 1.9$ | | |
| $r_3 = -54.857$ | | |
| $d_3 = 1.0$ | $n_2 = 1.78472$ | $\nu_2 = 25.71$ |
| $r_4 = 24.898$ | | |
| $d_4 = 2.868$ | | |
| $r_5 = 28.016$ | | |
| $d_5 = 3.934$ | $n_3 = 1.8061$ | $\nu_3 = 40.95$ |
| $r_6 = -48.585$ | | |
| $d_6 = 11.103$ | | |
| $r_7 = -8.910$ | | |
| $d_7 = 1.0$ | $n_4 = 1.50137$ | $\nu_4 = 56.4$ |
| $r_8 = -13.422$ | | |

In embodiments shown in the above, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses.

Figure 1:
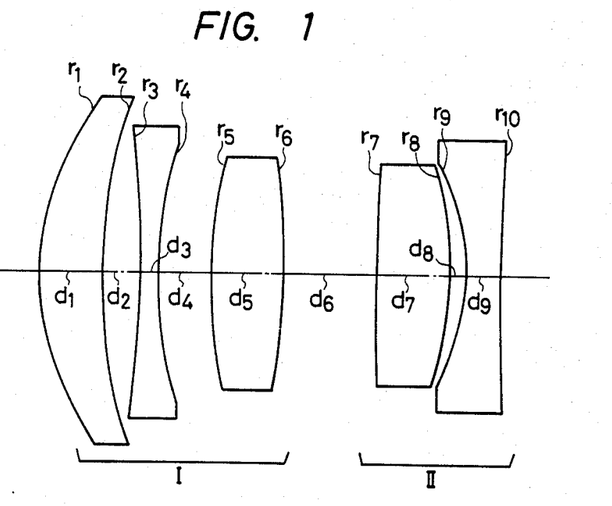
FIGS. 1 and 2 respectively show sectional views of Embodiment 1 of the vari-focal photographic lens system of rear lens group exchange type according to the present invention in the wide position and teleposition.
Figure 2:
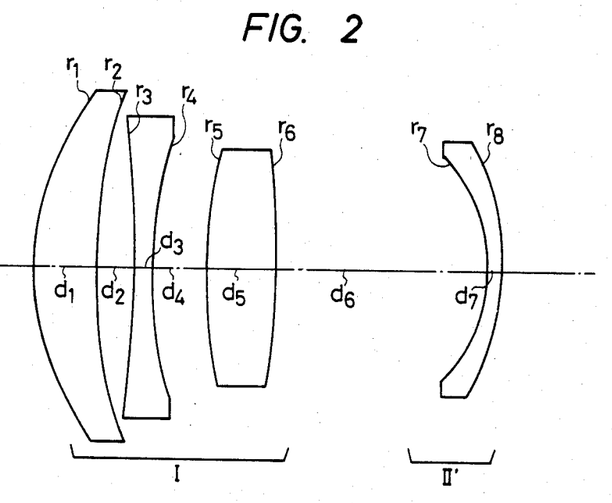

Out of respective embodiments shown in the above, Embodiment 1 has the lens configurations as shown in FIGS. 1 and 2. Out of them, FIG. 1 shows the lens configuration of Embodiment 1 in the wide position and FIG. 2 shows the lens configuration of Embodiment 1 in the teleposition. That is, to change over from the wide position to the teleposition, the front lens group I is moved toward the object side and the first rear lens group II is exchanged for the second rear lens group II'.

In said Embodiment 1, the front lens group I has positive refractive power, and the rear lens groups II and II' (wide position and teleposition) respectively have negative refractive powers. The lens configurations of said Embodiment 1 belong to the general telephoto type and have an advantage that it is possible to make the overall length of the lens system short.

Besides, Embodiment 1 has the relation of $0 < f_M < f_W$ given in the table shown before, and the magnification of the rear lens group is larger than 1. Therefore, the amount of movement $\Delta x$ of the front lens group is increased in respect to the amount of movement $\Delta x'$ of the image as expressed by the following formula:

$$\Delta x' \approx \beta_R^2 \cdot \Delta x$$

where, reference symbol $\beta_R$ represents the magnification of the rear lens group.

Therefore, the amount of movement of the front lens group required for correction of the image position is small. Consequently, the amount of variation in the position of the entrance pupil becomes small, variation of offaxial aberrations is thereby made small, and it is advantageous for correction of aberrations.

In Embodiment 1, the rear lens group for the teleposition is composed of a negative meniscus lens having a convex surface on the image side. The shape of said negative meniscus lens is effective for minimizing offaxial aberrations to be caused.

Besides, the lens system is arranged so that residual chromatic aberration of the front lens group is offset by chromatic aberration to be caused by the rear lens group. Therefore, the rear lens group is composed of one lens.

In the wide position, correction of offaxial aberrations becomes difficult because the field angle becomes large, and correction of spherical aberration also becomes difficult because the F-number becomes small. Taking these points into consideration, the rear lens group for the wide position is composed of two lenses, i.e., a positive lens and a negative lens. Furthermore, to correct Petzval's sum, it is preferable to arrange that the refractive index of the positive lens is larger than the refractive index of the negative lens.

Figure 5:
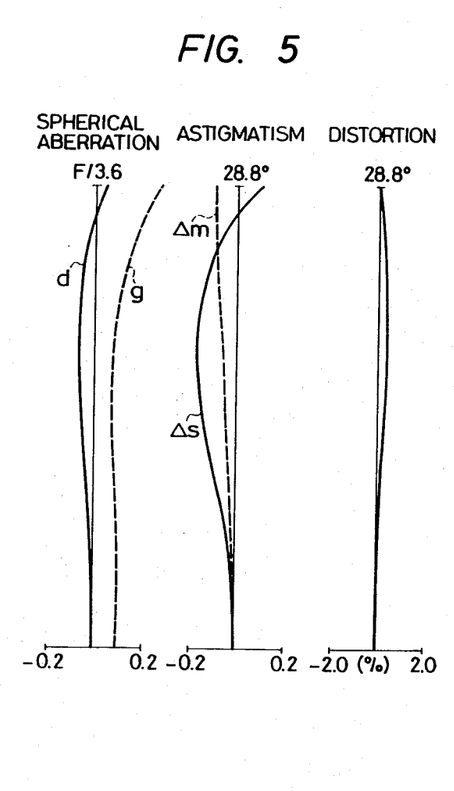
FIGS. 5 and 6 respectively show graphs illustrating aberration curves of Embodiment 1 of the present invention in the wide position and teleposition.
Figure 6:
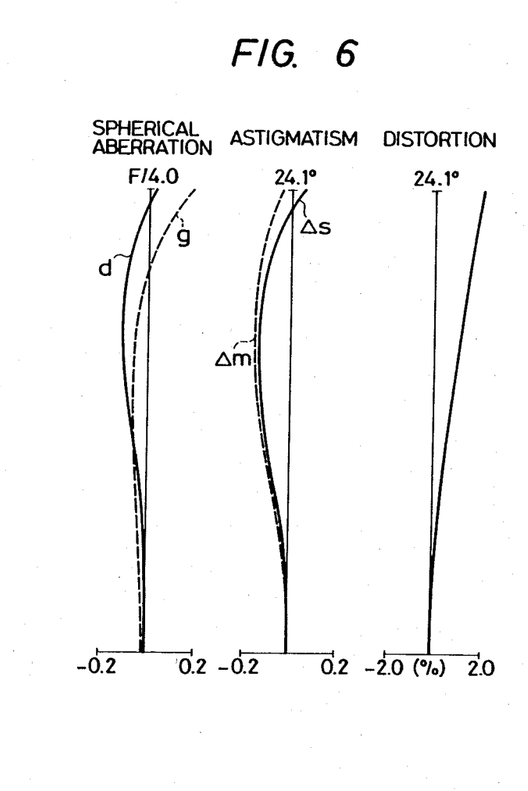
Figure 7:
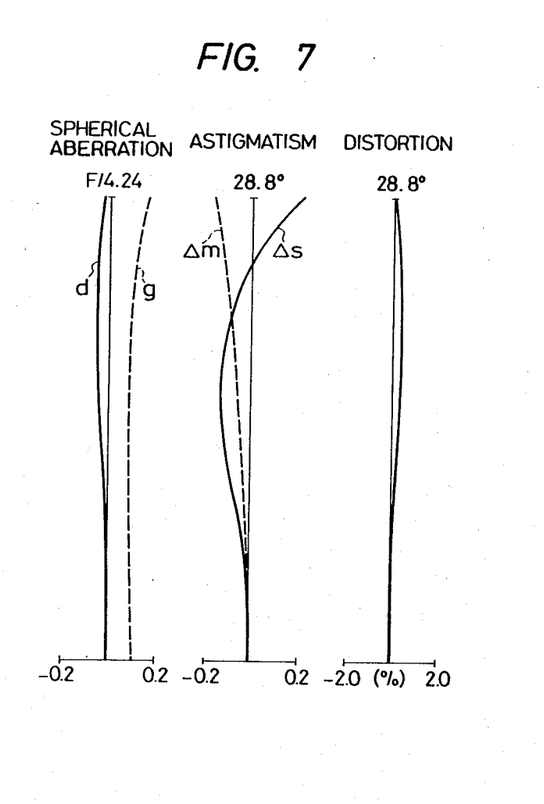
FIGS. 7 and 8 respectively show graphs illustrating aberration curves of Embodiment 2 of the present invention in the wide position and teleposition.
Figure 8:
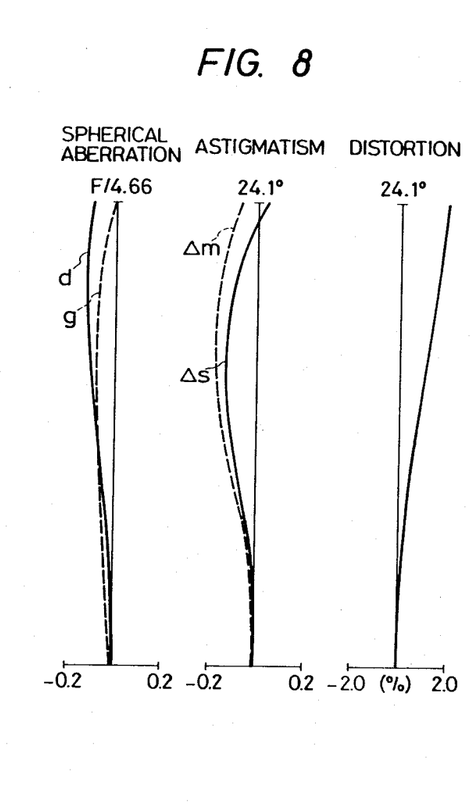

Aberration curves of Embodiment 1 in the wide position and in the teleposition are respectively shown in FIGS. 5 and 6.

Figure 3:
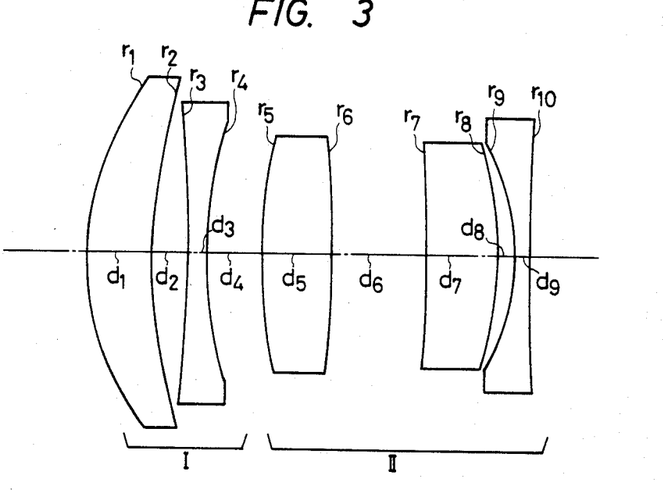
FIGS. 3 and 4 respectively show sectional views of Embodiment 2 of the vari-focal photographic lens system according to the present invention in the wide position and teleposition.
Figure 4:
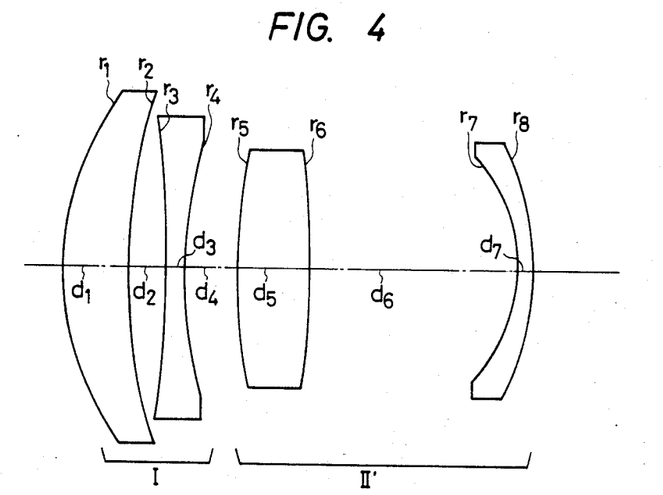

Embodiment 2 has the lens configurations shown in FIGS. 3 and 4. Out of them, FIG. 3 shows the lens comfiguration of Embodiment 2 in the wide position and FIG. 4 show the lens configuration of Embodiment 2 in the teleposition.

In said Embodiment 2, to change over from the wide position to the teleposition, the front lens group I is moved toward the object side and the first rear lens group II is exchanged for the second rear lens group II' so as to vary the focal length.

In said Embodiment 2, the number of lenses constituting the rear lens group is increased so as to thereby reduce coma flare to be caused. On the other hand, the front lens group is composed of two lenses so that the number of lenses constituting the lens system as a whole does not increase.

In case of Embodiment 2, the front lens group has negative refractive power, and the rear lens group for the wide position and rear lens group for the teleposition respectively have positive refractive powers. Therefore, when considered from the view point of distribution of refractive powers to the front lens group and rear lens group, the lens configurations of Embodiment 2 belong to the inverted telephoto type, and this type of lens system are not advantageous for making the overall length of the lens system short. However, as the rear lens groups are arranged to have telephoto type lens configurations, the size of the lens system as a whole is made about the same as Embodiment 1.

As described so far, the vari-focal photographic lens system of rear lens group exchange type according to the present invention is arranged that the rear lens group is inserted to and taken out of a wide space between the front lens group and image surface and, therefore, it is possible to compose the rear lens group exchange mechanism so that it will not interfere with the lens advancing mechanism or exposure mechanism. Besides, as the degree of freedom for selection of the place for arranging the rear lens group is high, it is possible to easily select the optimum position from the view points of changing of focal length, correction of image position, correction of aberrations, etc.

Furthermore, for respective states of focal length such as the wide position, teleposition, etc., it is possible to adopt individually different types of lens configurations for the rear lens group. Therefore, by arranging the rear lens group so that it has an adequate lens configuration according to the position of the front lens group, position of the stop, F-number, etc. in each state of focal length, it is possible to arrange that aberrations of the lens system as a whole are corrected in the optimum state.

Besides, as illustrated by respective embodiments, it is possible to make the overall length of the lens system short by adopting the refractive power distribution of telephoto type for the front lens group and rear lens group or for respective lens components constituting the rear lens group.

Moreover, as the front lens group is used in common to respective states of focal length, it is possible to prevent increase in the number of lenses constituting the lens system and, therefore, it is possible to prevent the cost of production from increasing.

We claim:

1. A vari-focal photographic lens system of rear lens group exchanging type comprising, in the order from the object side, a front lens group and a rear lens group, said front lens group consisting of a positive lens, a negative lens and a positive lens, having a positive refracting power as a whole, and being located more toward the object side position in the tele-position than the position in the wide position, said rear lens group being arranged to be exchangeable in the tele-position and in the wide-position, and consisting of a positive lens and a negative lens in the wide position and consisting of a negative lens in the tele-position, said vari-focal photographic lens system being arranged to vary the focal length of the lens system as a whole by exchanging said rear lens group.

2. A vari-focal photographic lens system of rear lens group exchange type according to claim 1 having the numerical data shown below and arranged to vary the focal length of the lens system as a whole by exchanging from the first rear lens group to the second rear lens group and, at the same time, by moving said front lens group toward the object side:

(wide position)
$f = 39.33, F/3.6$
$r_1 = 14.716$
$d_1 = 3.6$   $n_1 = 1.7725$   $\nu_1 = 49.66$   ⎫
$r_2 = 30.689$
$d_2 = 1.9$
$r_3 = -54.826$
$d_3 = 1.0$   $n_2 = 1.78472$   $\nu_2 = 25.71$   ⎬ I
$r_4 = 24.888$
$d_4 = 2.868$
$r_5 = 28.021$
$d_5 = 3.934$   $n_3 = 1.8061$   $\nu_3 = 40.95$
$r_6 = -48.605$
$d_6 = 4.917$   ⎭
$r_7 = -246.227$
$d_7 = 4.25$   $n_4 = 1.883$   $\nu_4 = 40.76$   ⎫
$r_8 = -21.327$
$d_8 = 0.806$   ⎬ II
$r_9 = -12.182$
$d_9 = 0.853$   $n_5 = 1.59271$   $\nu_5 = 35.29$   ⎭
$r_{10} = -1407.457$ (teleposition)
$f = 48.25, F/4$
$r_1 = 14.716$
$d_1 = 3.6$   $n_1 = 1.7725$   $\nu_1 = 49.66$   ⎫
$r_2 = 30.689$
$d_2 = 1.9$
$r_3 = -54.826$
$d_3 = 1.0$   $n_2 = 1.78472$   $\nu_2 = 25.71$   ⎬ I
$r_4 = 24.888$
$d_4 = 2.868$
$r_5 = 28.021$
$d_5 = 3.934$   $n_3 = 1.8061$   $\nu_3 = 40.95$
$r_6 = -48.605$
$d_6 = 11.077$   ⎭
$r_7 = -8.905$
$d_7 = 1.0$   $n_4 = 1.50137$   $\nu_4 = 56.40$   ⎬ II'
$r_8 = -13.404$ where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, reference symbol I represents the front lens group, and reference symbols II and II' respectively represent the first and second rear lens groups.

3. A vari-focal photographic lens system of rear lens group exchanging type comprising, in the order from the object side, a front lens group and a rear lens group, said front lens group consisting of a positive lens and a negative lens, having a positive refracting power as a whole, and being located toward the object side position in the tele position than in the wide position, said rear lens group being arranged to be exchangeable in the tele-position and in the wide position, and consisting of a positive lens, a positive lens and a negative lens in the wide position and consisting of a positive lens and a negative lens in the tele-position, said vari-focal photographic lens system being arranged to vary the focal length of the lens system as a whole by exhanging said rear lens group.

4. A vari-focal photographic lens system of rear lens group exchange type according to claim 3 having the numerical data shown below and arranged to vary the focal length of the lens system as a whole by exchanging from the first rear lens group to the second rear lens group and, at the same time, by moving said front lens group toward the object side:

(wide position)
f = 39.37, F/4.24
r₁ = 14.712
d₁ = 3.6      n₁ = 1.7725    ν₁ = 49.66  ⎫
r₂ = 30.622                              ⎪
d₂ = 1.9                                 ⎪
r₃ = −54.857                             ⎬ I
d₃ = 1.0      n₂ = 1.78472   ν₂ = 25.71  ⎪
r₄ = 24.898                              ⎪
d₄ = 3.016                               ⎭
r₅ = 29.687
d₅ = 3.855    n₃ = 1.863     ν₃ = 41.53  ⎫
r₆ = −53.4                               ⎪
d₆ = 4.762                               ⎪
r₇ = −297.795                            ⎬ II
d₇ = 4.229    n₄ = 1.883     ν₄ = 40.76  ⎪
r₈ = −20.258                             ⎪
d₈ = 0.784                               ⎪
r₉ = −12.318                             ⎪
d₉ = 0.876    n₅ = 1.62005   ν₅ = 36.25  ⎭
r₁₀ = 675.413
(teleposition)
f = 48.25, F/4.66
r₁ = 14.712
d₁ = 3.6      n₁ = 1.7725    ν₁ = 49.66

-continued r₂ = 30.622                              ⎫
d₂ = 1.9                                 ⎪
r₃ = −54.857                             ⎬ I
d₃ = 1.0      n₂ = 1.78472   ν₂ = 25.71  ⎪
r₄ = 24.898                              ⎪
d₄ = 2.868                               ⎭
r₅ = 28.016                              ⎫
d₅ = 3.934    n₃ = 1.8061    ν₃ = 40.95  ⎪
r₆ = −48.585                             ⎬ II′
d₆ = 11.103                              ⎪
r₇ = −8.910                              ⎪
d₇ = 1.0      n₄ = 1.50137   ν₄ = 56.4   ⎭
r₈ = −13.422 where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, reference symbol I represents the front lens group, and reference symbols II and II′ respectively represent the first and second rear lens groups.

* * * * *